(12) United States Patent
Yates et al.

(10) Patent No.: US 10,438,232 B2
(45) Date of Patent: Oct. 8, 2019

(54) EXPOSURE PROFILE OPTIMIZATION

(71) Applicant: Facebook, Inc., Menlo Park, CA (US)

(72) Inventors: Andrew Donald Yates, San Francisco, CA (US); Kurt Dodge Runke, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 141 days.

(21) Appl. No.: 15/676,928

(22) Filed: Aug. 14, 2017

(65) Prior Publication Data

US 2019/0050892 A1 Feb. 14, 2019

(51) Int. Cl.
*G06Q 30/02* (2012.01)
(52) U.S. Cl.
CPC ..... *G06Q 30/0244* (2013.01); *G06Q 30/0275* (2013.01); *G06Q 30/0277* (2013.01)
(58) Field of Classification Search
CPC .......... G06Q 30/0244; G06Q 30/0275; G06Q 30/0277
USPC ...................................................... 705/14.43
See application file for complete search history.

(56) References Cited

FOREIGN PATENT DOCUMENTS

WO    WO-8810339 A1 * 12/1988 ............. E01C 5/005

OTHER PUBLICATIONS

Jacob Warwick, How to create more exposure using linkedln, 2016 (Year: 2016).*

* cited by examiner

*Primary Examiner* — Tarek Elchanti
(74) *Attorney, Agent, or Firm* — Fenwick & West LLP

(57) ABSTRACT

An online system determines how presenting an awareness campaign to a user will affect the user's likelihood of converting to a related direct response campaign. For the user, the online system creates a benchmark exposure profile representing the user's exposure history before the awareness campaign. Similarly, the online system determines the user's simulated exposure profile, which represents the user's brand exposure history after having been exposed to the awareness campaign. A response prediction for the direct response campaign is determined for the benchmark exposure profile and the simulated exposure profile. The online system estimates the difference between the response prediction and the simulated response prediction to determine a delivery control value of presenting the awareness campaign to a user. The delivery control value is used to determine an effective impression value for the awareness campaign and conversion value for the related direct response campaign.

20 Claims, 4 Drawing Sheets

EXPOSURE PROFILE OPTIMIZATION

BACKGROUND

This disclosure relates to online systems, and more specifically to models for presenting sponsored content items to users of an online system, such as a social networking system.

Online services, such as online systems, search engines, news aggregators, Internet shopping services, and content delivery services, have become a popular venue for presenting sponsored content to prospective buyers. Some online services provide their services to users free of charge or charge only minimal fees. To generate revenue, the online services present sponsored content items to users, who may take certain actions based on the presented sponsored content items. Displaying a sponsored content item to a user is referred to herein as an "impression." Online services often use a scheme that charges fees proportional to the number of times the sponsored content items are displayed to the users, or actions taken by the users in response to viewing the sponsored content items. Actions taken by the users may include, among others, the following: (i) clicking on the sponsored content items, (ii) registration to the sponsored content provider's service or product, and (iii) conclusion of a sale of a service or product.

Some online services have adopted a system that allows multiple sponsored content providers to bid for a content item space. When a sponsored content item is required for a particular content item space, the sponsored content item with the highest bid price is selected and presented in the content item space. Sponsored content providers may use models to determine a bid price based on number of impressions, number of interactions, or expected revenue values. The context in which a sponsored content item is displayed may affect its value to a sponsored content provider and, thus, affect the amount a sponsored content provider is willing to bid for the sponsored content item. The context may include the sponsored content item being displayed to a high-value user that is likely to click-on, purchase, or download a presented item. Accordingly, a sponsored content item is selected for display based on a highest determined bid from among the sponsored content providers.

Sponsored content providers may provide content campaigns that aim to promote "brand awareness" or to obtain a "direct response." Awareness campaigns increase exposure of a brand to users, which may increase a user's interest in the presented product or service. Awareness campaigns may not require an action from the user and, thus, are typically measured by number of impressions, dwell time of an impression, or number of click-throughs, but may not otherwise solicit a direct response. A sponsored content provider may determine a bid price for an awareness sponsored content item using an impression-based model or certain interaction-based models. Direct response campaigns specifically aim to drive a specific action of a user, such as sales of the presented product or service or interactions with a page leading to a conversion of a user. Direct response campaigns require an action from a user (e.g., registration to or sale of a service or product) and are typically measured and may be priced by the number of conversions. An advertiser may determine a bid price for a direct response sponsored content item using an interaction-based model.

A common strategy in campaigns is to first run an awareness campaign to generate awareness of a product or service, followed by a related direct response campaign to drive interactions to use the increased awareness of the product or service. However, these joint awareness-direct response campaigns are run in an ad-hoc way and without any explicit optimization method between them. In particular, awareness campaigns may be optimized for impressions, clicks, or dwells but have no optimization related to how the awareness campaign will influence the related direct response campaign. Likewise, direct response campaigns are typically optimized without any explicit information about the prior exposure history of users.

SUMMARY

An online system receives requests for content items from user devices and identifies eligible sponsored content campaigns to provide sponsored content items to the requests. The eligible sponsored content campaigns include awareness campaigns and related direct response campaigns. The online system determines how presenting a sponsored content item of an awareness campaign will affect a user's likelihood of performing a conversion for the related direct response campaign. This information allows the online system to select awareness campaigns for presentation to users in a beneficial, cost-effective manner.

To model this likelihood, the online system creates a benchmark exposure profile, which represents a user's exposure history without having been exposed to a sponsored content item of the identified eligible awareness campaign. The online system uses the user's benchmark exposure profile to determine the user's benchmark response prediction to a sponsored content item of the related direct response campaign. Similarly, the online system creates a user's simulated exposure profile, which represents the user's exposure history after having been exposed to a sponsored content item of the identified awareness campaign, and uses the user's simulated exposure profile to determine the user's simulated response prediction to the same sponsored content item of the related direct response campaign. The response predictions may be determined with machine learned models that predict responses to content items using, in part, a user's exposure profile. The online system determines a change in predicted response between the user's benchmark response prediction and the user's simulated response prediction, which indicates whether or not it may be beneficial to show the user the sponsored content item of the related direct response campaign. If a user's likelihood of converting increases, this indicates that it may be valuable to show the user the sponsored content item of the awareness campaign because it may more significantly affect the user's likely interaction with the sponsored content item of the related direct response campaign. The online system thus uses the user's benchmark response prediction and the user's simulated response prediction to determine a delivery control value of showing the user the sponsored content item of the identified awareness campaign. The delivery control value is then used to determine an effective impression value for the sponsored content item of the identified awareness campaign and may also be used to determine an appropriate conversion value for the sponsored content item of the related direct response campaign. In some embodiments, the effective impression value for the sponsored content item of the identified awareness campaign may affect the conversion value for the sponsored content item of the related direct response campaign.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
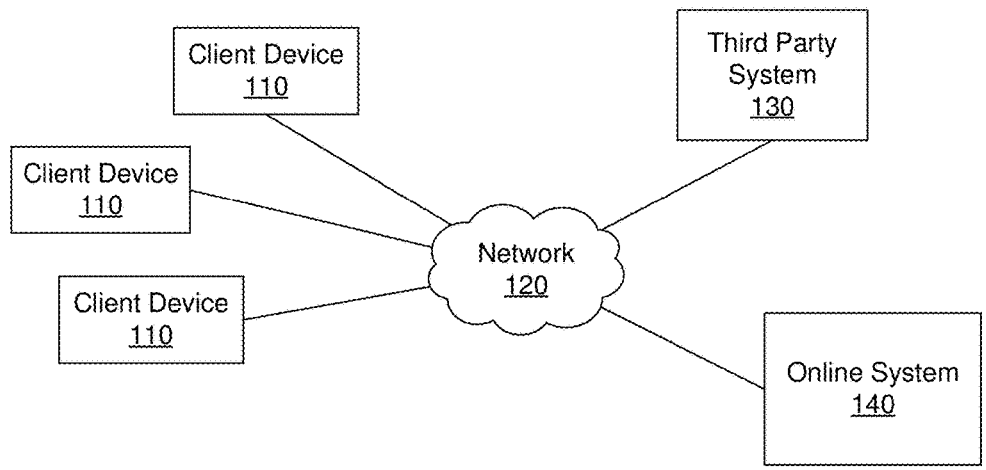
FIG. 1 is a block diagram of a system environment for an online system, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

In one embodiment, the third party system 130 uses a tracking pixel or piece of HTML code placed by the third party system 130 on third-party websites to monitor users visiting the websites that have not opted out of tracking. A tracking pixel might be included on various pages, including on a product page describing a product, on a shopping cart page that the user visits upon putting something into a shopping cart, on a checkout page that the user visits to checkout and purchase a product, etc. For example, a tracking pixel results in a transparent 1×1 image, an iframe, or other suitable object being created for third party pages. When a user's browser loads a page having the tracking pixel, the tracking pixel results in the user's browser attempting to retrieve the content for that pixel, and the browser contacts the online system 140 to retrieve the content. The request sent to the online system 140, however, actually includes various data about the user's actions taken on the third party website. The third party website can control what data is sent to the online system. For example, the third party system 130 may include information about the page the user is loading (e.g., is it a product page, a shopping cart page, a checkout page, etc.), about information on the page or about a product on the page of interest to the user (e.g., the SKU number of the product, the color, the size, the style, the current price, any discounts offered, the number of products requested, etc.), about the user (e.g., the third party's user identifier (UID) for the user, contact information for the user, etc.), and other data. In some embodiments, a cookie set by the online system 140 can also be retrieved by the online system 140, which can include various data about the user, such as the online systems' UID for the user, information about the client device and the browser, such as the Internet Protocol (IP) address of the client device, among other data. Tracking can also be performed on mobile applications of content providers by using a software development kit (SDK) of the online system 140 or via an application programming interface (API) of the online system 140 to track events (e.g., purchases) that occur by users on the content provider's app that are reported to the online system 140.

The online system 140 can then use this data received about the user to serve better content to the user in the future (e.g., since the online system has further data about products purchased or browsed that might be of interest), and can also use this in retargeting of that product to the user (e.g., where the user went to the product page on the third party site by clicking on sponsored content of the third party presented to the user in the online system 140). The online system 140 can also use this data in conversion tracking and reporting results of advertising campaigns to the third party. For example, if the third party has spent money at the online system 140 to have the online system 140 serve ads for its products, and a particular user views sponsored content on the online system 140 and then purchases the product advertised (possibly at some point later, and possibly on a different device), the online system 140 can link the purchase/conversion to the sponsored content originally shown on the online system 140. Thus, the online system 140 can include this data in its reporting to the third party system 130 of how many conversions the sponsored content campaign received.

Figure 2:
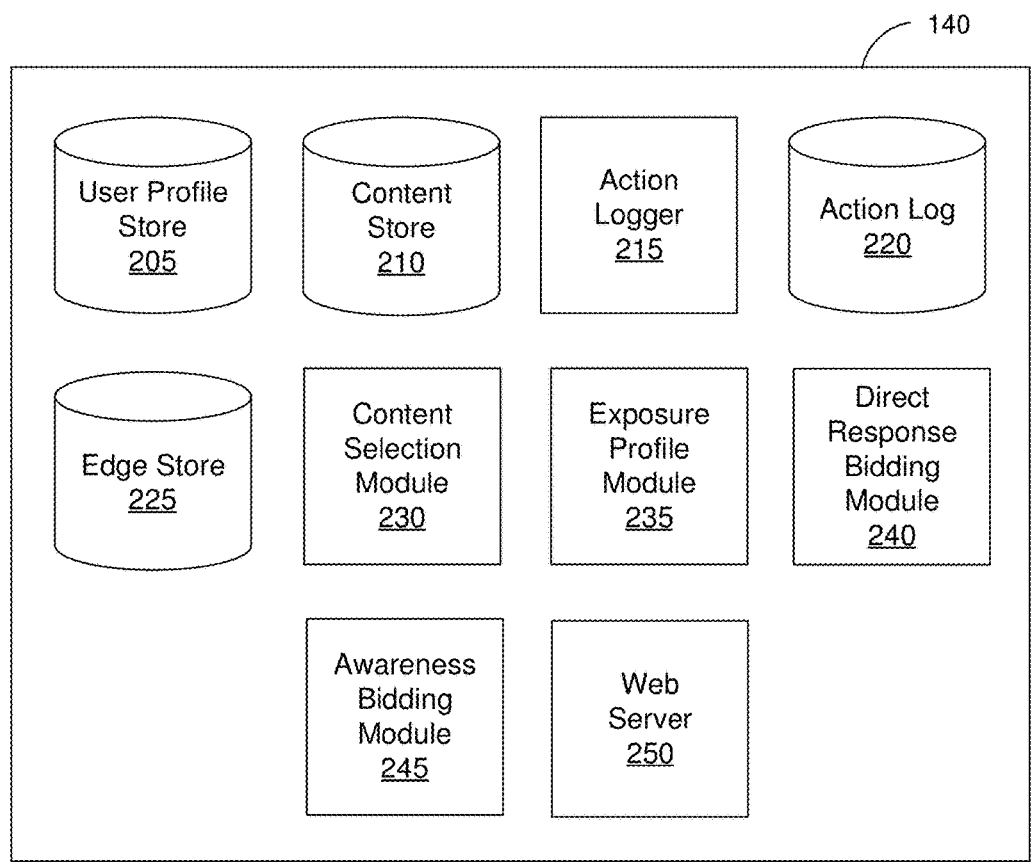
FIG. 2 is a block diagram of an architecture of the online system, in accordance with an embodiment.

FIG. 2 is a block diagram of an architecture of the online system 140. The online system 140 identifies sponsored content campaigns to provide sponsored content items to a user. The sponsored content campaigns include awareness campaigns and related direct response campaigns. The online system determines how presenting a sponsored content item of an awareness campaign will affect a user's likelihood of performing a conversion for the related direct response campaign, allowing the online system to select awareness campaigns for presentation to users in a beneficial, cost-effective manner. The online system 140 shown in FIG. 2 includes a user profile store 205, a content store 210, an action logger 215, an action log 220, an edge store 225, a content selection module 230, an exposure profile module 235, an awareness bidding module 240, a direct response bidding module 245, and a web server 250. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. In some embodiments, the online system 140 receives compensation from a user associated with a content item as online system users perform interactions associated with the content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

One or more content items included in the content store 210 include sponsored content for presentation to a user and a bid amount. The sponsored content is text, image, audio, video, or any other suitable data presented to a user. In various embodiments, the sponsored content also specifies a page of content. For example, a sponsored content item includes a landing page specifying a network address of a page of content to which a user is directed when the sponsored content item is accessed. The bid amount is included in a sponsored content item by a user and may be used to determine a delivery control value, such as monetary compensation, provided by a sponsored content provider to the online system 140 if content in the sponsored content item is presented to a user, if the content in the sponsored content item receives a user interaction when presented, or if any suitable condition is satisfied when content in the sponsored content item is presented to a user. For example, the bid amount included in a sponsored content item specifies a monetary amount that the online system 140 receives from a user who provided the sponsored content item to the online system 140 if content in the sponsored content item is displayed. In some embodiments, the delivery control value to the online system 140 of presenting the content from the sponsored content item may be determined by multiplying the bid amount by a probability of the content of the sponsored content item being accessed by a user. In some embodiments, the online system 140 determines the delivery control value as a heuristic that approximates an expected value of presenting the sponsored content item.

In various embodiments, the content store 210 includes multiple sponsored content campaigns, which each include one or more sponsored content items. A sponsored content campaign may be associated with a set of delivery parameters (e.g., a budget, a target average price paid, etc.), one or more objectives, or a duration. In various embodiments, a campaign is associated with one or more characteristics that are attributed to each sponsored content item of the campaign. For example, a bid amount associated with a campaign is associated with each sponsored content item of the campaign. Similarly, an objective associated with a campaign is associated with each sponsored content item of the campaign. In various embodiments, a third party system 130 providing sponsored content items to the online system 140 provides the online system 140 with various campaigns each including sponsored content items having different characteristics (e.g., associated with different sponsored content, including different types of sponsored content for presentation), and the campaigns are stored in the content store 210. Additionally, a sponsored content campaign may include targeting criteria, so multiple sponsored content items in the campaign are eligible to users having characteristics satisfying one or more of the targeting criteria associated with the campaign.

Sponsored content campaigns may be associated with one or more objectives for actions associated with the sponsored content campaign. An objective describes one or more goals for interactions that an entity associated with a content item desires other users to perform when presented with content included in the sponsored content item. Example goals may include: a number of impressions of sponsored content included in the sponsored content campaign desired by an entity associated with the sponsored content campaign or a number of a particular type of interaction performed by users presented with sponsored content of the sponsored content campaign. An "impression" is an instance in which a sponsored content item is presented to a user of the online system 140. In some embodiments, a "dwell time" of the impression may be measured, which indicates the amount of time a user spends with a sponsored content item. Types of interactions performed by users on sponsored content items may include, but are not limited to, a click-through, a user registration, a sale of a service or product, or any other action defined as valuable to the sponsored content campaign. Click-throughs may be determined by users who click on the sponsored content item, and may also be measured as a "click through rate" describing the ratio of users performing a click per number of impressions. Some of these types of interactions may be considered "conversions," wherein the user has converted into a customer. A historical conversion rate identifies a percentage or number of online system users performing a conversion when presented with the sponsored content.

Different sponsored content campaigns may have different objectives, such as to promote "brand awareness" or to obtain a "direct response." Direct response campaigns specifically aim to drive sales of the sponsored product or service by converting users into customers. Direct response campaigns solicit an interaction from a user (e.g., registration to or sale of a service or product) and are typically measured by the number of conversions. See FIG. 3B for an example sponsored content item of a direct response campaign. Awareness campaigns aim to increase exposure of a brand to users, which may increase a user's interest in the sponsored product or service and subsequently increase "direct response" activity by a user. Awareness campaigns may or may not require an action from the user and, thus typically promote future interaction with the sponsor that may not be directly promoted by the advertisement. See FIG. 3A for an example sponsored content item of an awareness campaign. As previously mentioned, awareness campaigns may be used to promote interaction with a related direct response campaign.

A conversion value for sponsored content of a direct response campaign may be based on these conversions. In some embodiments, an awareness campaign may be related to one or more direct response campaigns and specify one or more direct response campaigns that the awareness campaign is intended to promote. As discussed further below, the effective impression value for the awareness campaign may be determined based on the expected effect of the awareness campaign on the user's likely response to the related direct response campaign. Each related campaign may promote the same product or service, related products or services, or each campaign may be run by the same sponsored content provider or related sponsored content providers. For example, an awareness campaign may include sponsored content items that promote the health benefits of going to a spa and the amenities of a specific spa. In the same example, a first related direct response campaign may invite a user to subscribe to receive a monthly newsletter from the spa, and a second related direct response campaign may promote a holiday sale for spa packages at the specific spa.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user.

Alternatively, the content selection module 230 ranks content items based on their associated measures of relevance and selects content items having the highest positions in the ranking or having at least a threshold position in the ranking for presentation to the user.

Content items eligible for presentation to the user may include sponsored content items associated with bid amounts. The content selection module 230 uses the bid amounts associated with sponsored content requests when selecting content for presentation to the user. In various embodiments, the content selection module 230 determines a delivery control value associated with various content items based on their bid amounts and selects sponsored content items associated with a maximum delivery control value or associated with at least a threshold delivery control value for presentation. A delivery control value associated with a sponsored content item represents an estimated expected amount of compensation to the online system 140 for presenting the content item. For example, the delivery control value associated with a sponsored content item is a product of the sponsored content request's bid amount and a likelihood of the user interacting with the sponsored content item. The content selection module 230 may rank sponsored content items based on their associated bid amounts and select sponsored content items having at least a threshold position in the ranking for presentation to the user. In some embodiments, the content selection module 230 ranks both content items not associated with bid amounts and sponsored content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed may include one or more sponsored content items associated with bid amounts and other content items, such as stories describing actions associated with other online system users connected to the user, which are not associated with bid amounts. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who are not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a newsfeed including a plurality of content items selected for presentation to the user. One or more content items may also be included in the feed. The content selection module 230 may also determine the order in which selected content items are presented via the feed. For example, the content selection module 230 orders content items in the feed based on likelihoods of the user interacting with various content items.

The exposure profile module 235 retrieves information from the action log 220 to create an exposure profile for a user. In the embodiment of FIG. 2, the exposure profile module 235 creates a benchmark exposure profile and a simulated exposure profile for a user. A user's benchmark exposure profile represents a user's exposure to previous sponsored content items. In some embodiments, a user's benchmark exposure profile may include the user's exposure to sponsored content items from awareness campaigns, from direct response campaigns, or a combination of both. The exposure profile module 235 accesses the action log 220 to retrieve information about actions performed by a user on content items in the content store 210 and information about actions performed by the user on third party systems 130 that communicate information to the online system 140. Information about the actions may include webpage viewing histories, sponsored content items that were viewed or engaged, number of impressions or dwell time of those sponsored content items, purchases made, and other patterns from shopping and buying. The exposure profile module 235 creates the benchmark exposure profile for a user to allow the online system 140 to better predict the user's response to additional sponsored content items. The benchmark exposure profile may help predict a likelihood of a user interacting with a sponsored content item that is later presented to the user. In some embodiments, the sponsored content item later presented may be part of a direct response campaign related to an awareness campaign that has a conversion objective (e.g., making a purchase, registering an account, signing up for a subscription). For example, a user that has had multiple impressions with sponsored content for a brand of shoes may be more likely to purchase those shoes within a short amount of time.

The exposure profile module 235 is further configured to create the simulated exposure profile for a user. The simulated exposure profile represents the exposure profile of a user as if the user has been presented with a new sponsored content item of an awareness campaign. The simulated exposure profile may be used to help predict a likelihood of a user converting in a direct response campaign related to the awareness campaign, allowing the online system 140 to better predict a user's response to the direct response campaign. In one embodiment, the online system 140 may compare a user's benchmark exposure profile to the user's simulated exposure profile to determine how a user's exposure profile changes once an impression of an awareness sponsored content item is made on the user. In another embodiment, the online system 140 uses the benchmark exposure profile and the simulated exposure profile to determine a benchmark response prediction and a simulated response prediction, respectively. As a result, the online system 140 is able to measure a change in a user's predicted response to a direct response campaign given a user's exposure to awareness campaigns. In other words, the online system 140 may evaluate whether or not exposure to a new awareness campaign will increase a user's likelihood of converting in a related direct response campaign and, thus, if it would be valuable to run an awareness campaign for a certain user. This information allows the online system 140 to select awareness campaigns for presentation to users that account for the actual change in expected action for a direct response campaign, which enables the awareness campaign to more directly account for expected benefits of the awareness.

The direct response bidding module 240 determines a user's response prediction to a sponsored content item of a direct response campaign. The response prediction represents the likelihood that a user will interact with the sponsored content item as described by the objective of the direct response campaign (i.e., a conversion). In the embodiment of FIG. 2, the direct response bidding module 240 determines a response prediction using an exposure profile for a user. Using a benchmark exposure profile, the direct response bidding module 240 determines a benchmark response prediction for a user. The user's benchmark response prediction may be based on specific types of prior actions by the user associated with previously presented sponsored content items as characterized by the user's benchmark exposure profile. For example, the expected likelihood and extent of interaction is determined based on the user's prior indications of preference for previously presented sponsored content items within a specified time interval or based on the user's accessing of previously presented sponsored content items within a specified time interval. In some embodiments, the benchmark response prediction may also be based on other users' interaction with the sponsored content item when presented with the sponsored content item. The user's interactions may be predicted based on a computer model that reflects interactions by other users having similar characteristics to the user. This determination may be based on information retrieved from the user profile store 205, the action log 220, or the edge store 225 describing interactions between the user and presented sponsored content items as well as between the particular sponsored content item and other users. The online system may further determine the benchmark response prediction for a sponsored content item based in part on a measure of the user's interaction with other sponsored content items from the same sponsored content provider and/or other sponsored content items in the same campaign. Similarly, the direct response bidding module 240 is able to determine a user's simulated response prediction using a user's simulated exposure profile. The simulated response prediction represents the likelihood that a user will interact with a sponsored content item of a direct response campaign after having been shown a new sponsored content item of a related awareness campaign. The simulated response prediction allows the online system 140 to evaluate whether or not exposure to a new awareness campaign will increase a user's likelihood of converting in a related direct response campaign and, thus, if it would be valuable to run an awareness campaign for the user before presenting the related direct response campaign.

The direct response bidding module 240 is further configured to determine a conversion value for a sponsored content item of a direct response campaign. The conversion value may be based on a monetary amount that the online system 140 receives from a sponsored content provider if an objective of the sponsored content is achieved, as described by the direct response campaign. In some embodiments, the conversion value is based on an expected revenue from presenting the sponsored content, a historical conversion rate of the sponsored content, or an amount of revenue received from prior interactions with the sponsored content. The direct response bidding module 240 may also take into account a user's benchmark response prediction to a sponsored content item of a direct response campaign. If a user's benchmark response prediction indicates that the user may be very likely to interact with the sponsored content item, it may be valuable to show the user sponsored content items from a specific direct response campaign. Accordingly, the direct response bidding module 240 may increase the conversion value of a direct response sponsored content item to increase the chance of being selected by the content selection module 230 for presentation to a user.

The awareness bidding module 245 determines a delivery control value of presenting a sponsored content item of an awareness campaign to a user. In the embodiment of FIG. 2, the awareness bidding module 245 determines the change between a user's benchmark response prediction and simulated response prediction. By comparing the two response predictions, the awareness bidding module 245 is able to evaluate whether or not exposure to a new brand awareness campaign will increase a user's likelihood of converting in a related direct response campaign and, thus, if it would be valuable to run a brand awareness campaign for the user. If a user's likelihood of converting increases, this indicates that it may be valuable to show the user sponsored content items from a specific awareness campaign because the user may be very likely to later interact with the sponsored content item of the related direct response campaign. Accordingly, the delivery control value of presenting the awareness sponsored content increases. On the other hand, if a user's likelihood of converting remains the same or decreases, this indicates that it may not be valuable to show the user sponsored content items from a specific awareness campaign. In such a case, the online system 140 may limit or prevent future delivery of sponsored content items from the specific awareness campaign to that user.

Determining the delivery control value of an awareness campaign allows the online system 140 to more effectively target users for the presentation of sponsored content items of awareness campaigns and to optimize the downstream presentation of direct response campaigns to users. In one example, the awareness bidding module 245 determines the delivery control value of presenting a sponsored content item of an awareness campaign to a user according to Equation (1):

$$\text{Delivery Control Value} = (\Delta eCVR) * (\text{Conversion Value}) \quad (1),$$

where $\Delta$ eCVR is a heuristic value that approximates the difference in the expected conversion rate (i.e., the benchmark response prediction based on a user's benchmark exposure profile and the simulated response prediction based on a user's simulated exposure profile) and the conversion value is for the sponsored content item of the direct response campaign. The conversion value may be specified by the advertiser for the direct response campaign, may be based on a historical conversion rate of the direct response sponsored content item or an amount of revenue received from prior interactions with the direct response sponsored content item, or may be based on a user's benchmark response prediction, as discussed above. The awareness bidding module 245 inputs the benchmark response prediction and the simulated response prediction to determine the $\Delta$ eCVR, the estimated difference in the expected conversion rate. This information allows the awareness bidding module 245 to determine how presenting the awareness sponsored content item to the user affects the user's likelihood of converting to a related direct response sponsored content item that is later presented to the user.

The awareness bidding module 245 is further configured to determine the effective impression value for a sponsored content item of the awareness campaign. The determined delivery control value of the sponsored content item allows the online system 140 to determine an effective impression value for the sponsored content item. As previously described, the effective impression value may be based on an amount of compensation an entity associated with the sponsored content campaign will provide to the online system 140 for presenting the sponsored content to the user. In one example, the awareness bidding module 245 determines the effective impression value for a sponsored content item of an awareness campaign according to Equation (2):

$$\text{Effective Impression Value} = \text{Baseline Impression Value} + \alpha * \text{Delivery Control Value} \quad (2),$$

where Baseline Impression Value is a standard value for presenting the sponsored content item, α is a bias multiplier, and Delivery Control Value is an estimated expected value of presenting a sponsored content item of an awareness campaign to a user. The Baseline Impression Value is a standard value for a sponsored content item of an awareness campaign, which may be based on a historical bid amount for the sponsored content item. The bias multiplier may be an upward or a downward multiplier of the Delivery Control Value. In some embodiments, the bias multiplier may be a downward multiplier to mitigate a sponsored content provider from over-paying for both an awareness campaign and a related direct response campaign. The bias multiplier may be specified by the sponsored content campaign. The online system 140 may configure the bias multiplier for individual sponsored content campaigns, sets of sponsored content campaigns, or the system as a whole. In some embodiments, the Delivery Control Value is determined using Equation 1. In this equation, the Effective Impression Value is increased or decreased proportional to the delivery control value of the sponsored content item.

The web server 250 links the online system 140 via the network 120 to the one or more client devices 110, as well as to the one or more third party systems 130. The web server 250 serves web pages, as well as other content, such as JAVA®, FLASH®, XML and so forth. The web server 250 may receive and route messages between the online system 140 and the client device 110, for example, instant messages, queued messages (e.g., email), text messages, short message service (SMS) messages, or messages sent using any other suitable messaging technique. A user may send a request to the web server 250 to upload information (e.g., images or videos) that are stored in the content store 210. Additionally, the web server 250 may provide application programming interface (API) functionality to send data directly to native client device operating systems, such as IOS®, ANDROID™, or BlackberryOS.

Exposure Profile Optimization

Figure 3B:
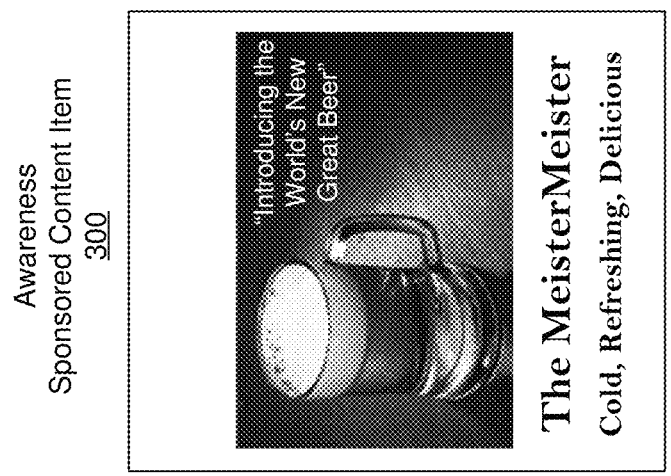
FIGS. 3A and 3B illustrate example sponsored content items, in accordance with an embodiment.
Figure 3A:
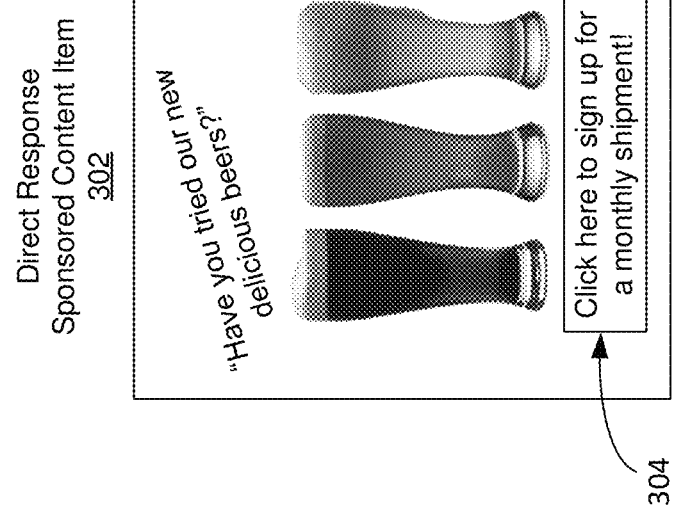

FIGS. 3A and 3B illustrate example sponsored content items, in accordance with an embodiment. FIG. 3A illustrates an awareness sponsored content item 300. As previously described, the goal of an awareness campaign is to increase exposure of a brand to users, which may increase a user's interest in the sponsored product or service. Awareness sponsored content items may or may not require an action from the user. In the embodiment of FIG. 3A, the awareness sponsored content item 300 depicts a new beer "The MeisterMeister" as cold, refreshing, and delicious. The awareness sponsored content item 300 promotes the world introduction of "The MeisterMeister" without requiring user interaction. As discussed herein, the awareness sponsored content item may be evaluated for placement to a user according to its expected effect on user interaction with a direct response sponsored content item.

FIG. 3B illustrates a direct response sponsored content item 302. As previously described, the goal of a direct response campaign is to drive sales of the sponsored product or service by converting users into customers. In the embodiment of FIG. 3B, the direct response sponsored content item 302 depicts a selection of delicious beer, asking a user if he or she has tried the beer and providing the user an option to sign up for a monthly shipment of beer. The direct response sponsored content item 302 invites the user to interact with the sponsored content item by clicking on a button 204 to gain more information about the sponsored selection of beer and to sign up for the monthly shipment of a selection of beer (e.g., a conversion). In some embodiments, the button 204 may direct a user to a page that allows the user to subscribe his/her email address for information and updates from the sponsored content provider, to register an account with the sponsored content provider, or any other similar interaction that brings the sponsored content provider closer to a product sale. These interactions may also be considered conversions of the sponsored content item 302. As described with regards to FIG. 2, the brand awareness sponsored content item 300 and the direct response sponsored content item 302 may be used in conjunction as part of a related awareness campaign and direct response campaign.

Figure 4:
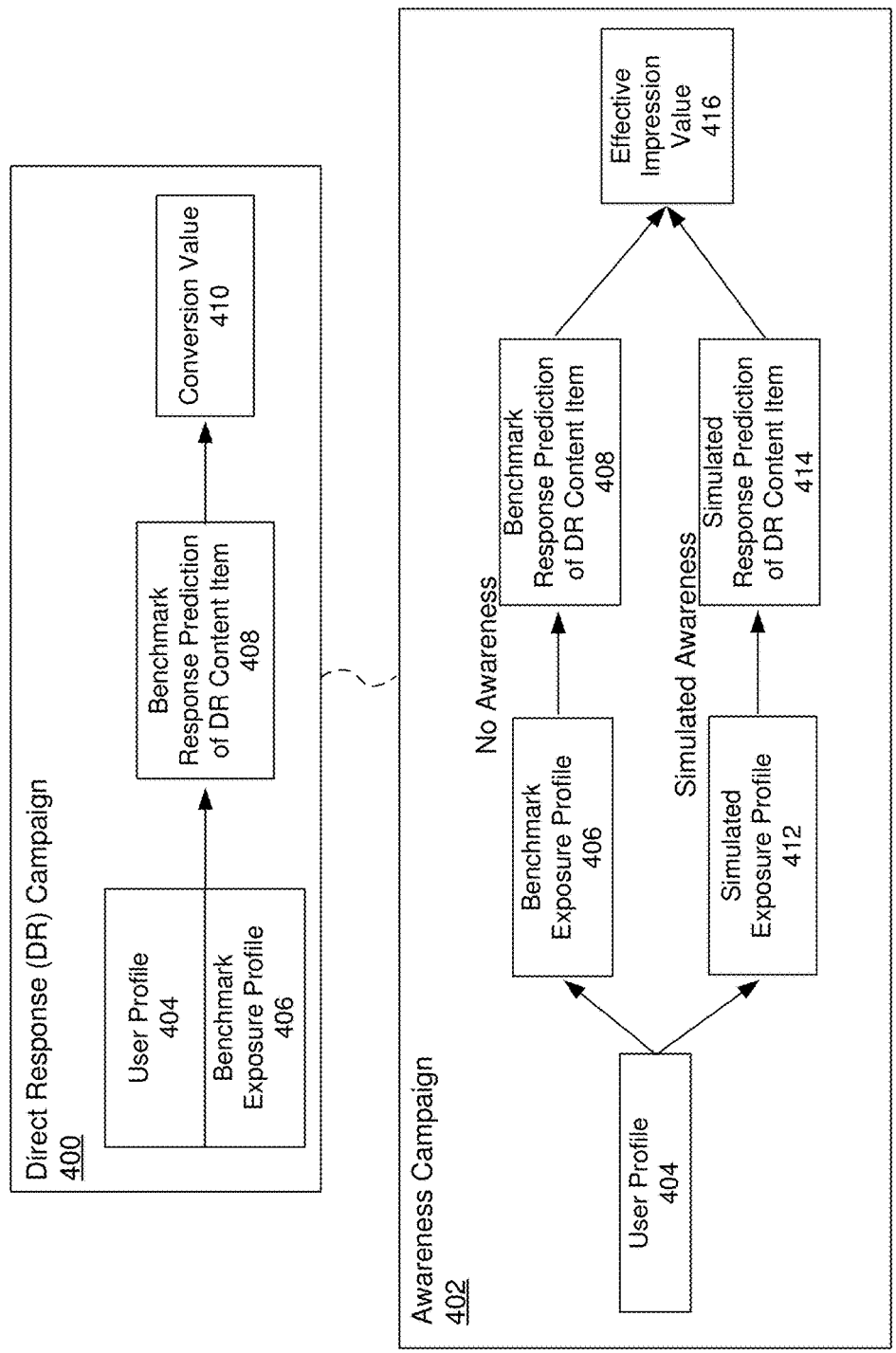
FIG. 4 is an example data flow chart for the online system having a related direct response campaign and an awareness campaign, in accordance with an embodiment.

FIG. 4 is an example data flow chart for the online system having a related direct response campaign 400 and an awareness campaign 402, in accordance with an embodiment. As previously described, the online system 140 is configured to estimate the delivery control value of presenting an awareness sponsored content item to a user based on how the exposure will affect a user's response to a direct response sponsored content item that is later presented to him or her and to further determine an effective impression value for the awareness sponsored content item based on the determined delivery control value.

The direct response campaign 400 may have one or more direct response sponsored content items for presentation to a user. As previously described, each direct response sponsored content item is associated with an objective defined by the direct response campaign 400. In some embodiments, the objective is a type of conversion from the user interacting with the direct response sponsored content item. To determine an appropriate conversion value for a direct response sponsored content item of the direct response campaign 400, the online system 140 takes several factors into consideration. For a specific user, a user profile 404 is accessed from the user profile store 205. As described with regards to FIG. 2, the exposure profile module 235 creates a benchmark exposure profile 406 for the user, which represents the user's exposure to previous sponsored content items. In benchmark exposure profile 406, the user has not been exposed to an awareness sponsored content item of the related awareness campaign 402. The benchmark exposure profile 406 is input into the direct response bidding module 240. The direct response bidding module 240 determines a user's benchmark response prediction 408 to a direct response sponsored content item of the related direct response campaign. The user's benchmark response prediction 408 represents the likelihood that the user will interact with the direct response sponsored content item of the direct response campaign 400 as described by the objective of the direct response campaign 400 (i.e., a conversion). The benchmark response prediction 408 may be determined with machine learned models that predict responses to content items using, in part, the user's benchmark exposure profile 406. The user's benchmark response prediction 408 is used to determine a conversion value 410 for the direct response sponsored content item of the direct response campaign 400. The conversion value 410 is used by the content selection module 230 during the selection process of which sponsored content items to present to a user.

The awareness campaign 402 may have one or more awareness sponsored content items for presentation to a user. As previously described, each awareness sponsored content item aims to increase exposure of a brand to a user. In some embodiments, each awareness sponsored content item is measured by number of impressions or a click-through rate. To determine an effective impression value for an awareness sponsored content item of the awareness campaign 402 that is related to the direct response campaign 400, the online system 140 determines the delivery control value of presenting the awareness sponsored content item and how it may affect a user's response to the related direct response sponsored content item of the direct response campaign 400. In a similar manner to the direct response campaign 400, for the specific user, the user profile 404 is accessed from the user profile store 205, and the exposure profile module 235 creates a benchmark exposure profile 406 for the user. In the benchmark exposure profile 406, the user has not been exposed to a brand awareness sponsored content item of the awareness campaign 402. Similarly, the exposure profile module 235 creates a simulated exposure profile 412 for the user, which represents the user's exposure to previous sponsored content items, including exposure to the brand awareness sponsored content item of the awareness campaign 402. The simulated exposure profile 412 is input into the direct response bidding module 240 to determine a user's simulated response prediction 414 to a direct response sponsored content item of the related direct response campaign 400. The user's simulated response prediction 414 represents the likelihood that the user will interact with the direct response sponsored content item of the direct response campaign 400 as described by the objective of the direct response campaign 400 (i.e., a conversion) after being exposed to the awareness sponsored content item of the awareness campaign. The simulated response prediction 414 may be determined with machine learned models that predict responses to content items using, in part, the user's simulated exposure profile 412.

The user's benchmark response prediction 408 and the user's simulated response prediction 414 are used to estimate the delivery control value of presenting the awareness sponsored content item of the awareness campaign 402 to the user. The awareness bidding module 240 estimates the delivery control value by using Equation 1, as described with regards to FIG. 2. The approximate difference between the user's benchmark response prediction 408 and simulated response prediction 414 (i.e., Δ eCVR) is multiplied with the conversion value of the direct response sponsored content item of the direct response campaign 400. The conversion value of the direct response sponsored content item may be based on a historical conversion rate of the direct response sponsored content item or an amount of revenue received from prior interactions with the direct response sponsored content item. In some instances, the conversion value may or may not correspond to the conversion value 410 of the direct response campaign 400.

The delivery control value of presenting the awareness sponsored content item of the awareness campaign 402 is then used to determine the effective impression value 416 for the awareness sponsored content item of the awareness campaign 402. The awareness bidding module 245 uses Equation 2, as described with regards to FIG. 2. The delivery control value is multiplied by the bias multiplier, which is then added to the ECPM. In some embodiments, the conversion value 410 may be adjusted to account for the effective impression value 416 and mitigate a sponsored content provider from over-paying for the awareness campaign 402 and the related direct response campaign 400. In this configuration, the awareness campaign acts as a signal for the direct response campaign and allows the online system 140 to optimize the presentation of awareness sponsored content items based on its effect on a user's predicted response to a related direct response sponsored content item.

Figure 5:
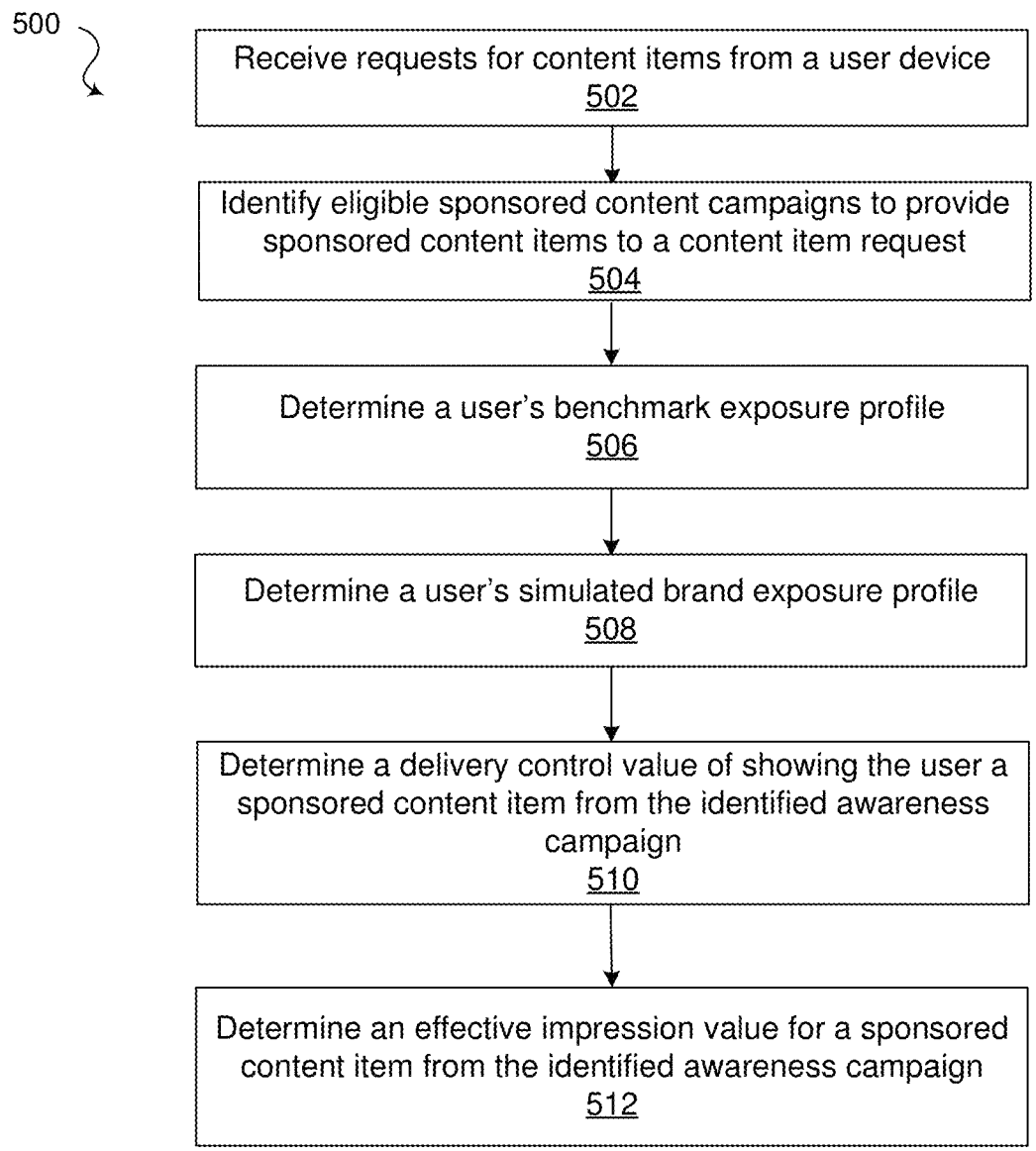
FIG. 5 is a flowchart illustrating a process of effective impression value determination for a sponsored content item of an awareness campaign, in accordance with an embodiment.

FIG. 5 is a flowchart 500 illustrating a process of effective impression value determination for a sponsored content item of an awareness campaign, in accordance with an embodiment. The process shown in FIG. 5 is performed by the online system 140 and may use data received from the third party system 130.

The online system 140 first receives 502 requests for content items from user devices 502. The online system 140 identifies 504 eligible sponsored content campaigns to provide sponsored content items to a content item request. In the embodiment of FIG. 5, the eligible sponsored content campaigns are awareness campaigns that are related to direct response campaigns. The eligibility of a sponsored content campaign may be based on the set of delivery parameters or targeting criteria associated with the sponsored content campaign. For the user of the user device, the online system 140 determines 506 the user's benchmark exposure profile, which represents the user's exposure history without having been exposed to a sponsored content item of the identified eligible awareness campaign. Similarly, the online system 140 determines 508 the user's simulated exposure profile, which represents the user's exposure history after having been exposed to a sponsored content item of the identified awareness campaign. The user's benchmark exposure profile is used to determine the user's response prediction to a sponsored content item of a related direct response campaign. Similarly, the user's simulated exposure profile is used to determine the user's simulated response prediction to a sponsored content item of a related direct response campaign. The online system 140 measures a change between the user's benchmark response prediction and the user's simulated response prediction to determine 510 a delivery control value of showing the user the sponsored content item of the identified awareness campaign. As described with regards to FIG. 4, the delivery control value is determined using a conversion value for the related direct response campaign based on the user's benchmark exposure profile. The determined delivery control value allows the online system 140 to determine 512 an effective impression value for showing the user the sponsored content item from the identified awareness campaign. In some embodiments, the online system 140 may then determine a conversion value for showing the user a sponsored content item from a direct response campaign related to the identified awareness campaign. In some embodiments, the conversion value may be equal to the conversion value used to determine the delivery control value of the sponsored content item of the awareness campaign. In other embodiments, the conversion value may be adjusted to account for the effective impression value and to mitigate a sponsored content provider from over-paying for the awareness campaign and the related direct response campaign.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   identifying, by the online system, an awareness content campaign comprising a first sponsored content item to promote awareness, the awareness content campaign related to a direct response content campaign having a desired user action, and a second sponsored content item, the second sponsored content item having a value based on the performance of the desired user action by a user in response to viewing the second sponsored content item;
   identifying an opportunity to provide a sponsored content item to a user device associated with a user;
   determining, by the online system, a first exposure history of a user prior to an exposure to the first sponsored content item;
   based on the first exposure history, determining, by a trained computer model, a first predicted likelihood of the performance of the desired user action by the user in response to viewing the second sponsored content item;
   determining, by the online system, a second exposure history of the user, the second exposure history comprising the first exposure history of the user and an exposure to the first sponsored content item;
   based on the second exposure history, determining, by the trained computer model, a second predicted likelihood of the performance of the desired user action by the user in response to viewing the second sponsored content item;
   determining, by the online system, a delivery control value of the first sponsored content item of the awareness campaign based in part on a difference between the first predicted likelihood and the second predicted likelihood;
   determining, by the online system, an impression value for the first sponsored content item of the awareness content campaign based in part on the delivery control value;
   selecting the first sponsored content item for presentation to the user based on the impression value; and
   sending the first sponsored content item for presentation to the user on the user device.

2. The method of claim 1, further comprising presenting the second sponsored content item to the user.

3. The method of claim 1, wherein the first exposure history of the user is based on historical actions by the user associated with sponsored content items of other awareness content campaigns.

4. The method of claim 1, wherein the first exposure history of the user is based on historical actions by other users associated with sponsored content items of other awareness content campaigns.

5. The method of claim 1, wherein the difference between the first predicted likelihood and the second predicted likelihood indicates that the performance of the desired user action by the user in response to viewing the second sponsored content item is more likely to occur.

6. The method of claim 1, wherein the difference between the first predicted likelihood and the second predicted likelihood indicates that the performance of the desired user action by the user in response to viewing the second sponsored content item is less likely to occur and, in response, preventing the presentation of the first sponsored content item to the user.

7. The method of claim 6, further comprising preventing the presentation of sponsored content items of other awareness content campaigns that are related to the awareness content campaign.

8. The method of claim 1, wherein the delivery control value is further based on a historical bid amount for the second sponsored content item.

9. The method of claim 1, wherein the impression value for the first sponsored content item is further based on a bias multiplier.

10. The method of claim 9, wherein the bias multiplier is specified by the awareness content campaign.

11. The method of claim 1, further comprising determining a conversion value for the second sponsored content item based on the impression value for the first sponsored content item.

12. A computer system comprising:
a processor for executing computer program instructions; and
a non-transitory computer readable storage medium storing computer program instructions executable on the processor and comprising instructions for:
identifying, by the online system, an awareness content campaign comprising a first sponsored content item to promote awareness, the awareness content campaign related to a direct response content campaign having a desired user action, and a second sponsored content item, the second sponsored content item having a value based on the performance of the desired user action by a user in response to viewing the second sponsored content item;
identifying an opportunity to provide a sponsored content item to a user device associated with a user;
determining, by the online system, a first exposure history of a user prior to an exposure to the first sponsored content item;
based on the first exposure history, determining, by a trained computer model, a first predicted likelihood of the performance of the desired user action by the user in response to viewing the second sponsored content item;
determining, by the online system, a second exposure history of the user, the second exposure history comprising the first exposure history of the user and an exposure to the first sponsored content item
based on the second exposure history, determining, by the trained computer model, a second predicted likelihood of the performance of the desired user action by the user in response to viewing the second sponsored content item;
determining, by the online system, a delivery control value of the first sponsored content item of the awareness campaign based in part on a difference between the first predicted likelihood and the second predicted likelihood;
determining, by the online system, an impression value for the first sponsored content item of the awareness content campaign based in part on the delivery control value;
selecting the first sponsored content item for presentation to the user based on the impression value; and
sending the first sponsored content item for presentation to the user on the user device.

13. The computer system of claim 12, the instructions further comprising instructions for presenting the second sponsored content item to the user.

14. The computer system of claim 12, wherein the first exposure history of the user is based on historical actions by the user associated with sponsored content items of other awareness content campaigns.

15. The computer system of claim 12, wherein the first exposure history of the user is based on historical actions by other users associated with sponsored content items of other awareness content campaigns.

16. The computer system of claim 12, wherein the difference between the first predicted likelihood and the second predicted likelihood indicates that the performance of the desired user action by the user in response to viewing the second sponsored content item is more likely to occur.

17. The computer system of claim 12, wherein the difference between the first predicted likelihood and the second predicted likelihood indicates that the performance of the desired user action by the user in response to viewing the second sponsored content item is less likely to occur and, in response, preventing the presentation of the first sponsored content item to the user.

18. The computer system of claim 12, wherein the delivery control value is further based on a historical bid amount for the second sponsored content item.

19. The computer system of claim 12, wherein the impression value for the first sponsored content item is further based on a bias multiplier, and the bias multiplier is specified by the awareness content campaign.

20. The computer system of claim 12, the instructions further comprising instructions for determining a conversion value for the second sponsored content item based on the impression value for the first sponsored content item.

* * * * *